3,489,677
Patented Jan. 13, 1970

3,489,677
REMOVAL OF ELEMENTAL SULFUR CONTAMINANTS FROM PETROLEUM OILS
William H. Thompson, Lafayette, and Eldred E. Young, Concord, Calif., assignors to Shell Oil Company, New York, N.Y., a corporation of Delaware
No Drawing. Filed Nov. 20, 1967, Ser. No. 684,507
Int. Cl. C10g 29/02
U.S. Cl. 208—236         11 Claims

ABSTRACT OF THE DISCLOSURE

A method of purifying elemental sulfur contaminated oils by treating such elemental sulfur contaminated oils with an aqueous solution containing a mixture of alkali hydrosulfide and corresponding hydroxide, e.g., ammonium hydrosulfide and ammonium hydroxide.

The present invention relates to a new and novel process for removing elemental sulfur from elemental sulfur contaminated petroleum oils. More particularly, the invention is directed to a process for the removal of dissolved and entrained elemental sulfur from elemental sulfur contaminated crude oils or fractions thereof, said oils or fractions thereof being used as carrier vehicles in the pipeline transportation of sulfur-oil slurries.

BACKGROUND OF THE INVENTION

It is well know in the art that very small amounts of naturally occurring elemental sulfur and sulfur compounds are present in petroleum oils or are formed due to chemical refinement of oils, such as by sulfuric acid treatment of oils, and that these sulfur and sulfur compounds can be effectively removed by chemical processing such oils with ammonia or alkali compounds, e.g., alkali metal hydroxide, as evidenced by reference to U.S. Patents 1,300,816; 1,413,005; 1,423,712; 1,974,724; 1,974,725; 3,185,641 and 3,250,697. However, these methods or other related methods known in the art are either ineffective or quite costly for removing elemental sulfur from oils which have been contaminated with large amounts (0.3–5% or 0.5–1.5%) of elemental sulfur. Oils contaminated with such large amounts of elemental sulfur must be effectively treated to remove essentially all of the entrained sulfur prior to processing these oils into industrial products such as gasoline, fuel oils, lubricating oils, etc. Also the presence of sulfur in these products causes corrosion, objectionable odors, air pollution etc., and therefore its removal is essential. Oils can become contaminated with such large amounts of elemental sulfur as when such oils are used as carrier vehicles in pipeline transportation of sulfur as described in the Redcay U.S. Patent 2,798,772 or in copending patent application Ser. No. 663,755, filed Aug. 28, 1967. Although these references, e.g., the Redcay patent, describe methods of separating the oil from the sulfur at the terminal end and thereafter purifying by chemical means the sulfur by removing any dissolved or entrained oil therefrom, no mention is made of purifying the carrier, namely the oil, which can be recycled and reused as a sulfur carrier without further purification. Available art is lacking on suggesting means for purifying oil carriers used in pipeline transportation of sulfur as a sulfur-oil slurry.

An object of the present invention is directed to a process for removing sulfur from sulfur contaminated oils.

Still another object of the present invention is directed to a process for removing elemental sulfur from elemental sulfur contaminated petroleum oil.

Also, it is an object of the present invention to purify crude oil and fractions thereof by chemically treating the oil and fractions thereof with a reactive aqueous solution capable of extracting from the oil any entrained or dissolved elemental sulfur present therein.

Other objects will become apparent during the following discussion of the invention.

SUMMARY OF THE INVENTION

Now in accordance with the present invention it has been found that elemental sulfur can be separated effectively from crude oil and fractions thereof containing less than about 5%, and generally between about 0.5% and 1.5% of elemental sulfur, by contacting such contaminated oils with an aqueous solution containing a mixture of an alkali hydrosulfide and hydroxide such as ammonium hydrosulfide and ammonium hydroxide for a period of time and under controlled temperature conditions to effect a reaction between the elemental sulfur dispersed or solubilized in the oil and the alkali compounds present in the aqueous solution so that on separation of the oil phase from the aqueous phase, the sulfur has been transferred in the latter phase where it is present as ammonium polysulfide. Elemental sulfur can be recovered therefrom by heating the solution preferably above 200° F. (240–250° F.), e.g., by a steam treat thereby effecting a chemical decomposition reaction whereby the ammonium polysulfide in the aqueous solution breaks down into elemental sulfur, ammonia, hydrogen sulfide and water. The precipitated elemental sulfur is readily removed from the residual aqueous solution by suitable means such as filtration, centrifugation or gravity settling while the remaining aqueous solution can be recycled and admixed with the vaporized portion of the aqueous contacting solution for further use to purify fresh batches of sulfur contaminated oils. The reaction taking place when the vaporized and aqueous liquid portions of the solvent are remixed after steam treating is as follows:

$$H_2O + H_2S + NH_3 \rightarrow NH_4^+ HS^- + NH_4OH \qquad (I)$$

By the process of this invention elemental sulfur contaminated oils having a sulfur content of from about 1% to about 2% can be reduced to values of less than 0.01% sulfur or even less. It is to be clearly understood that the process of the present invention effectively removes elemental sulfur contaminants from oils and that the indigenous sulfur in chemical forms in the oil other than the elemental form before becoming contaminated with elemental sulfur is unaffected by the contacting aqueous solution of the present invention.

The ratio of the oil to the contacting or treating aqueous solution can be varied over wide limits of from 20:1 to 1:20 and preferably between 10:1 and 5:1, respectively, and the treatment can be carried out at ambient temperatures or elevated temperatures, but preferably below 200° F. The aqueous phase can be separated from the oil phase by any suitable means such as gravity settling, centrifuging, etc. The ammonium polysulfide solution recovered can be decomposed by suitable means such as in a closed vessel or under nitrogen blanket to exclude air. Thus, on heating or distillation of the solution either liquid or granular solid yellow sulfur is precipitated and removed, while ammonia, hydrogen sulfide and some water are driven off, collected, cooled and recycled after absorption in the cooled aqueous liquid remaining after sulfur removal for further treatment of fresh batches of sulfur contaminated oils. When necessary or desirable, the treated oil can be further contacted with additional amounts of the aqueous treating solution to effect removal of any sulfur which has not been removed by the initial treatment and the process can be repeated as necessary until essentially all of the entrained and dissolved elemental sulfur is removed. Thus, a sulfur contaminated oil can be treated by the process of this invention so that the sulfur content of the treated oil is below about 0.01% and such oils can be safely processed in refineries to produce industrial products such as gasoline and lube oils, etc.

PREFERRED EMBODIMENT OF THE INVENTION

To summarize, the steps in removing elemental sulfur present as contaminates in oils comprises:

(1) Contacting or treating the elemental sulfur contaminated oil with an aqueous solution containing a mixture of alkali hydrosulfide and hydroxide, e.g., a mixture of ammonium hydrosulfide and ammonium hydroxide, preferably at ambient temperature for a period of time sufficient to effect a reaction between the elemental sulfur and the ammonium compounds in the aqueous solution;

(2) Separating the oil phase from the aqueous phase and further treating the separated oil phase if necessary by the process of step (1);

(3) Treating the separated aqueous phase containing a polysulfide, e.g., ammonium polysulfide, as a result of the reaction of step (1) to effect the breaking down of the ammonium polysulfide into elemental sulfur, hydrogen sulfide and ammonia;

(4) Treating the aqueous solution of step (3) from which ammonia and hydrogen sulfide have been removed to effect precipitation of elemental sulfur from the solution;

(5) Removing the sulfur by filtration, centrifuging, gravity settling, etc., and allowing the remaining reactants in the solution to interact with the hydrogen sulfide and ammonia previously removed in step (3) according to reaction (1); and (6) Using the solution of (5) as a recycling solution with fortification by new batches of aqueous solution as required in small amounts to replace losses for treatment of new batches of sulfur contaminated oil as in step (1).

The oil purification of sulfur contaminated crude oil is illustrated by the following example.

Crude oil used as a carrier vehicle in pipeline transportation of solid sulfur as a slurry was separated from the sulfur at the terminal end of the line and found to contain about 1.0 to 1.5% elemental sulfur entrained in the oil. About 10 parts of the sulfur contaminated crude oil was contacted with about 1 part of a saturated aqueous solution containing a mixture of $NH_4HS$ and $NH_4OH$ at ambient temperature for about 1–2 hours. The oil phase was found to contain about 0.01% sulfur after about ½ hour of contacting. The aqueous phase, after separation from the oil phase, was heated to about 240° F. under a nitrogen blanket to form elemental sulfur which was recovered from the solution after cooling by filtration.

The process of the present invention is particularly applicable to refining crude oil and fractions thereof used as carrier vehicles in pipeline transportation of molten sulfur such as decsribed in copending application Ser. No. 663,755 and as a result become contaminated with elemental sulfur which must be removed prior to refinery processing such as an oil and fractions thereof into industrial products such as gasoline, fuel oil, lubricating oil and other industrial products.

The foregoing description of the invention is merely intended to be explanatory thereof. Various changes in the details of the described method may be made within the scope of the appended claims without departing from the spirit of the invention.

We claim as our invention:

1. A method of purifying elemental sulfur contaminated petroleum oil comprising contacting the oil with an aqueous solution containing a mixture of ammonium hydrosulfide and ammonium hydroxide and removing the sulfur-free oil phase from the aqueous phase.

2. The process of claim 1 wherein the contacting of the two phases is effected at ambient temperature.

3. The process of claim 1 wherein the ratio of the oil phase to the aqueous phase varies from 20:1 to 1:20, respectively.

4. The process of claim 1 wherein the elemental sulfur content of the oil is at least 0.3% prior to treatment.

5. The process of claim 1 wherein the two phases are separated and the aqueous phase is heated to above 200° F. to precipitate the elemental sulfur and remove it from the aqueous phase by filtration.

6. The process of claim 1 wherein the two phases are separated and the aqueous phase is heated to above 200° F. to precipitate the elemental sulfur and remove it from the aqueous phase by centrifuging.

7. The process of claim 5 wherein separation is effected by gravity phase separation.

8. The process of claim 6 wherein separation is effected by gravity phase separation.

9. The process of claim 5 wherein the vapors released when the aqueous phase is heated to above 200° F. are recombined with the elemental-sulfur-free aqueous phase to regenerate the aqueous ammonium hydrosulfide and hydroxide solution for reuse.

10. The process of claim 6 wherein the vapors released when the aqueous phase is heated to above 200° F. are recombined with the elemental-sulfur-free aqueous phase to regenerate the aqueous ammonium hydrosulfide and hydroxide solution for reuse.

11. The process of claim 7 wherein the vapors released when the aqueous phase is heated to above 200° F. are recombined with the elemental-sulfur-free aqueous phase to regenerate the aqueous ammonium hydrosulfide and hydroxide solution for reuse.

References Cited

UNITED STATES PATENTS

| | | | |
|---|---|---|---|
| 1,692,756 | 11/1928 | Moran | 208—230 |
| 1,300,816 | 4/1919 | Cobb | 208—236 |

DELBERT E. GANTZ, Primary Examiner

J. M. NELSON, Assistant Examiner